(12) United States Patent (10) Patent No.: US 9,613,156 B2
Zhao et al. (45) Date of Patent: Apr. 4, 2017

(54) COOKIE INFORMATION SHARING METHOD AND SYSTEM

(71) Applicant: BEIJING QIHOO TECHNOLOGY COMPANY LIMITED, Xicheng, Beijing (CN)

(72) Inventors: Xiaoyong Zhao, Beijing (CN); Juyuan Zhang, Beijing (CN); Wenping Zuo, Beijing (CN); Huan Ren, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 0 days.

(21) Appl. No.: 14/388,097

(22) PCT Filed: Mar. 19, 2013

(86) PCT No.: PCT/CN2013/072841
§ 371 (c)(1),
(2) Date: Sep. 25, 2014

(87) PCT Pub. No.: WO2013/143402
PCT Pub. Date: Oct. 3, 2013

(65) Prior Publication Data
US 2015/0121085 A1 Apr. 30, 2015

(30) Foreign Application Priority Data
Mar. 31, 2012 (CN) .......................... 2012 1 0093598

(51) Int. Cl.
*G06F 21/00* (2013.01)
*G06F 17/30* (2006.01)
(Continued)

(52) U.S. Cl.
CPC ............ *G06F 17/3089* (2013.01); *G06F 9/54* (2013.01); *H04L 9/3213* (2013.01); *H04L 63/00* (2013.01);
(Continued)

(58) Field of Classification Search
CPC ... H04L 67/02; H04L 67/22; H04L 29/06027; H04L 63/068; H04L 63/0807;
(Continued)

(56) References Cited

U.S. PATENT DOCUMENTS 7,908,645 B2 * 3/2011 Varghese ............. G06Q 20/341
715/773
8,639,679 B1 * 1/2014 Zhou ................... G06F 17/3097
707/706

(Continued)

OTHER PUBLICATIONS

International Search Report regarding Chinese International Application No. PCT/CN2013/072841 issued May 30, 2013, 6 pages.
(Continued)

*Primary Examiner* — Farid Homayounmehr
*Assistant Examiner* — Lizbeth Torres-Diaz
(74) *Attorney, Agent, or Firm* — James M. Stipek; John R. Bednarz; Polsinelli PC

(57) ABSTRACT

This invention discloses a cookie information sharing method that comprises the following steps: reading cookie information in a parent browser, said parent browser being a browser which stores the cookie information; importing the cookie information read from the parent browser into a child browser, said child browser being a browser which needs to acquiring the cookie information from the parent browser. This application also provides a cookie information sharing system for realizing the proceeding method. The cookie information sharing method and system of this application are able to reduce occupancy of system resources by user's information records, and also to realize sharing of the user's information records.

8 Claims, 3 Drawing Sheets

(51) Int. Cl.
*H04L 29/08* (2006.01)
*G06F 9/54* (2006.01)
*H04L 9/32* (2006.01)
*H04L 29/06* (2006.01)

(52) U.S. Cl.
CPC ........ *H04L 63/083* (2013.01); *H04L 63/0807* (2013.01); *H04L 63/0815* (2013.01); *H04L 63/168* (2013.01); *H04L 67/02* (2013.01)

(58) Field of Classification Search
CPC ............... H04L 9/3213; G06F 17/3089; G06F 17/30899; G06F 21/6263
See application file for complete search history.

(56) References Cited

U.S. PATENT DOCUMENTS

| | | | | |
|---|---|---|---|---|
| 2004/0049673 | A1* | 3/2004 | Song | G06F 17/3089 713/150 |
| 2006/0212706 | A1* | 9/2006 | Jiang | H04L 9/0825 713/176 |
| 2007/0157304 | A1* | 7/2007 | Logan | H04L 67/02 726/12 |
| 2012/0215896 | A1* | 8/2012 | Johannsen | G06F 21/44 709/223 |
| 2013/0219482 | A1* | 8/2013 | Brandt | H04L 65/607 726/9 |
| 2013/0238745 | A1* | 9/2013 | Ramachandran | H04N 21/2396 709/217 |
| 2013/0290503 | A1* | 10/2013 | Rajkumar | G06Q 30/0241 709/223 |
| 2016/0234318 | A1* | 8/2016 | Fardig | H04L 67/148 |

OTHER PUBLICATIONS

English translation of abstract only of Chinese application CN101702647A, Title: Management Method of Cookie Information and Cookie Server, Publication date: May 5, 2010, Country: CN, Inventors: Zhonghua Chen, one page.

English translation of abstract only of Chinese application CN102129405A, Title: Cross-Browser Interactivity Testing, Publication date: Jul. 20, 2011, Country: CN, Inventors: Steve Guttman et al., one page.

English translation of abstract only of Chinese application CN102467506A, Title: Cookie Processing Method and System, Publication date: May 23, 2012, Country: CN, Inventors: Jinzhou Jiang, et al., one page.

* cited by examiner

COOKIE INFORMATION SHARING METHOD AND SYSTEM

FIELD OF THE INVENTION

This invention relates to computer data processing technique field, and in particular to a cookie information sharing method and system.

BACKGROUND OF THE INVENTION

As increasing development and enrichment of network applications, it is needed for people to manage accounts and passwords of more and more websites, wherein many websites, browsers and third party software provide applications to help user save and manage accounts and password, for example, functions of remembering passwords and auto-login of websites, login assistants, automatic filling, and smart filling of browsers and third party software. These applications can save and store accounts and passwords in user login pages at user local client. When user accesses aforesaid websites again through the same browser or third party software at the same local client, automatic login or automatic import of login information will be realized according to the information recorded in the local client, without requirement for user to input accounts and passwords manually, so as to give convenience to user greatly.

A common practice for achieving the aforesaid method is for the website server to adopt cookie to record user information. That is to say, the website server will send a segment of cookie while sending feedback information to user after receiving login information input by user, which segment of cookie records information on user identifier etc., to distinguish individual user. The browser used by user will parse the cookie, and store it in a corresponding directory of the local client browser. When user accesses the website again through the same client and browser, the browser will search a desired cookie in the corresponding directory, and then send it to the website server. In this method, because the cookie is parsed and stored by browser, the premise for achieving automatic login is that the use should use the same browser at two login times, but if using different browsers, it cannot be achieved and is needed to re-input login information.

SUMMARY OF THE INVENTION

Due to the above problem, this invention is proposed to provide a cookie information sharing method and system which can overcome the above problem, or at least partially resolve or mitigate the above problem.

According to one aspect of this invention, a cookie information sharing method is provided, comprising:

reading cookie information in a parent browser, said parent browser being a browser which stores cookie information;

importing the cookie information read from said parent browser into a child browser, said child browser being a browser which is needed to acquire the cookie information from the parent browser.

According to another aspect of this invention, a cookie information sharing system is provided, comprising reading module configured to read cookie information in a parent browser, said parent browser being a browser which stores cookie information;

importing module configured to import the cookie information read from said parent browser into a child browser, said child browser being a browser which is needed to acquire the cookie information from the parent browser.

According to yet another aspect of this invention, a computer program comprising computer readable codes is provided, which causes a server to perform the cookie information sharing method according to any one of claims 1 to 11, when said computer readable codes are executed on said server.

According to a further aspect of this invention, a kind of computer readable media is provided, which stores the computer program according to claim 23.

The beneficial effects of this invention are:

The cookie information sharing method and system of this invention can realize sharing and synchronization of cookie information between different browsers by acquiring the cookie information stored in a parent browser and importing it into a child browser, so as to achieve effective usage of resources. When user using a new browser, it is not necessary to re-input information which has been already input in other browsers, therefore facilitating its usage.

Furthermore, during acquiring cookie information, in addition to acquiring all of cookie information, it is also possible to acquire only some specific cookie information as required, so as to reduce data amount at each time of sharing and synchronization, therefore reducing occupancy of system resources.

The above description is merely an overview of the technical solutions of the invention. In the following particular embodiments of the invention will be illustrated in order that the technical means of the invention can be more clearly understood and thus may be embodied according to the content of the specification, and that the foregoing and other objects, features and advantages can be more apparent.

BRIEF DESCRIPTION OF THE DRAWINGS

Various other advantages and benefits will become apparent to those of ordinary skills in the art by reading the following detailed description of the preferred embodiments. The drawings are only for the purpose of showing the preferred embodiments, and are not considered to be limiting to the invention. And throughout the drawings, like reference signs are used to denote like components. In the drawings.

DETAILED DESCRIPTION OF THE INVENTION

This invention will be described further with reference to the appended figures and particular implementations.

In this application, a browser which stores cookie information is defined as a parent browser, and a browser which is needed to acquire cookie information from the parent browser is defined as a child browser.

Figure 1:
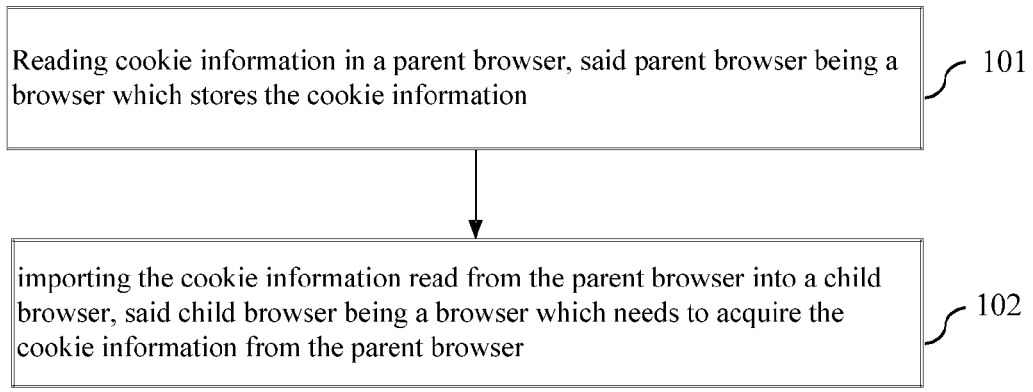
FIG. 1 is a flow chart of a first embodiment of the cookie information sharing method according to this application.

Referring to FIG. 1, a first embodiment of the cookie information sharing method of this application is shown, comprising the following steps:

Step 101, reading cookie information from the parent browser, said parent browser being a browser which stores cookie information.

Reading cookie information from the parent browser comprises both situations: reading all of cookie information in the parent browser or reading specific cookie information in the parent browser.

The following method is adopted to read all of cookie information in the parent browser:

identifying the storage path of the cookie information in the parent browser;

reading all of the cookie information from the storage path;

Each browser will establish a corresponding directory in hard drive of the local client where the browser locates to store files related to the browser. So does cookie information, every browser will have a specific directory to store all of cookie information about the browser. It is possible to find out the corresponding storage path of the cookie information of the browser by searching location of the browser in registry.

The cookie information acquired from the hard drive of the local client is information being processed by the browser, browsers will adopt encryption methods, which encryption methods may differ with respect to different browsers, to encrypt the cookie information, hence it is necessary to parse the cookie information in order to ensure that the cookie information being imported can be used by other browsers. Therefore, the method of this application further comprises parsing the cookie information read from the parent browser. The particular parsing process comprises:

analyzing and identifying the encryption method of the current cookie information;

decrypting the current cookie information according to the encryption method.

It is possible to read particular cookie information in the parent browser according to user's designation, and also possible to read automatically. The particular cookie information is referred to the cookie information about a particular website or several particular websites, and because different browsers encrypt cookie information in different ways, it will take much time to find out specific cookie information from all of cookie information, so that the following method can be adopted in order to save time:

starting up the parent browser;

acquiring domain name of the target website corresponding to the specific cookie information;

searching the cookie information corresponding to the domain name of the target website according to a mapping table of the domain name and the cookie, which table is created in memory after starting up of the parent browser.

Because the mapping table of the domain name and the cookie information is created automatically in memory after starting up of the browser, it is convenient to quickly send the cookie information to the respective website. This application can acquire the specific cookie information corresponding to the domain name with the aid of the mapping table. It is not necessary to parse the cookie information acquired from the mapping table in memory because it is not stored in the hard drive of the local client, and is still in the form of string at this time.

Preferably, the process of starting up the parent browser can be run in background, and the startup command can be created automatically and send to the parent browser by the cookie information sharing system of this application. It can reduce occupancy of the system resources as possible in such a way of running in background, and can also avoid causing interference and effect to user.

Step 102, importing the cookie information read from said parent browser into a child browser, said child browser being a browser which is needed to acquire the cookie information from the parent browser.

For all of the cookie information read directly from the storage path of the parent browser, importing the cookie information into the child browser in particular comprises:

identifying the storage path of the cookie information of the child browser;

encrypting the cookie information read from the parent browser according to the encryption method of the child browser;

importing the encrypted cookie information into the child browser according to the storage path of the cookie information of the child browser.

Preferably, it is possible to import the cookie information in original sequence in order to ensure accuracy of the imported data.

Additionally, for the specific cookie information, because it is a string acquired from memory, it can be imported in the following way:

transferring the cookie information read from the parent browser into the process of the child browser; and invoking system functions to write the cookie information in the process of the child browser into the child browser according to the storage path of the cookie information of the child browser, after starting up the child browser and before accessing to the webpage corresponding to the specific cookie information.

In particular, transferring the cookie information read from the parent browser into the process of the child browser can be achieved by means of memory mapping or file reading and writing. That is to say, a mapping area is established in memory or a file is created, and the string representing the cookie information is written into the mapping area or the file, and notifying the child browser which in turn reads the string from the respective mapping area or the file. The invoked system function for writing the cookie information in the process of the child browser into the child browser according to the storage path of the cookie information of the child browser is InternetSetCookie, which is a specific function provided to the browser by the system for invoking cookie information.

Figure 2:
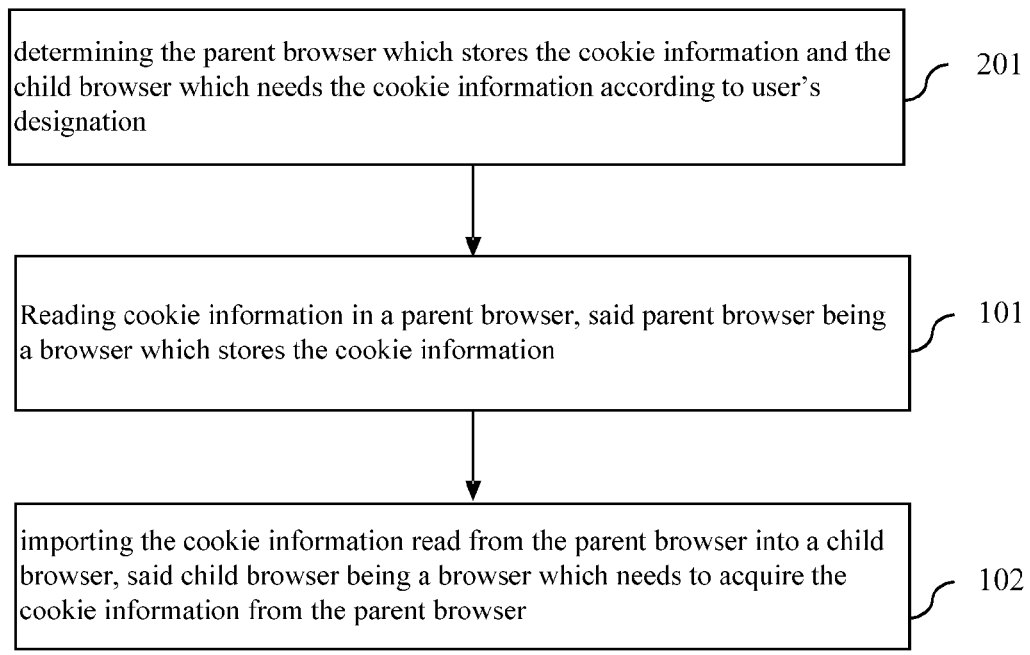
FIG. 2 is a flow chart of a second embodiment of the cookie information sharing method according to this application.

Preferably, referring to FIG. 2, there is shown a second embodiment of the cookie information sharing method of this application, which further comprises the following steps on the basis of the first embodiment.

Step 201, determining the parent browser storing the cookie information and the child browser needing the cookie information according to the user's designation.

wherein, an input field or option may be provided for the user to choose, so that when the user wishes to acquire the cookie information from a browser, he can input the name of the browser in the input field or select one browser from the option, and the parent browser can be determined by acquiring the input information or selection information by user.

Also, the same method can be adopted to determine the child browser.

Preferably, if a browser has a function module configured to implement the cookie information sharing method of this application, when a user uses the browser with the function module, and through the browser sends a request for acquiring cookie information of a parent browser, it is also possible to identify the browser with the function module as the child browser. At this point, usage of the user can be considered as a process of designating the child browser.

It can be understood that the process of determining a parent browser must be before the Step 101, whereas the process of determining a child browser may be before the Step 101, or after the Step 101, before the Step 102, for which this application has no limit.

The cookie information sharing method of this invention can realize sharing and synchronization of cookie information between different browsers by acquiring the cookie information already stored in a parent browser and importing it into a child browser, so as to achieve effective usage of resources. When user using a new browser, it is not necessary to re-input information which has been already input in other browsers, therefore facilitating its usage.

Furthermore, during acquiring cookie information, in addition to acquiring all of cookie information, it is also possible to acquire only some specific cookie information as required, so as to reduce data amount at every time of sharing and synchronization, therefore reducing occupancy of system resources.

Figure 3:
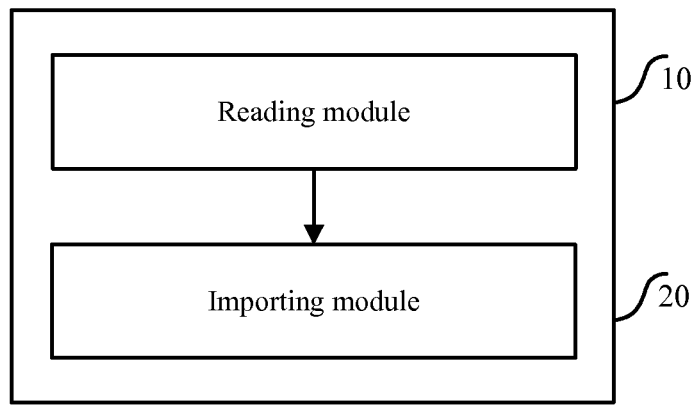
FIG. 3 is a structural schematic diagram of a first embodiment of the cookie information sharing system according to this application.

Referring to FIG. 3, there is shown a first embodiment of the cookie information sharing system of this application, which comprises a reading module 10 and an importing module 20.

Reading module 10, configured to read cookie information from the parent browser, said parent browser being a browser which stores cookie information.

Importing module 20, configured to import the cookie information read from said parent browser into a child browser, said child browser being a browser which is needed to acquire the cookie information from the parent browser.

Preferably, the reading module 10 comprises a full information reading unit and/or a specific information reading unit. The full information reading unit is configured to read all of cookie information in the parent browser. The specific information reading unit is configured to read specific cookie information in the parent browser. The specific information reading unit comprises a designated receiving sub-unit and/or an automatic reading sub-unit. The designated receiving sub-unit is configured to receive user's designation, through which the specific cookie information in the parent browser is read. The automatic reading sub-unit is configured to automatically read the specific cookie information from the parent browser.

The full information reading unit comprises a storage path identifying sub-unit and a cookie information reading sub-unit. The storage path identifying sub-unit is configured to determine the storage path of the cookie information in the parent browser. The cookie information reading sub-unit is configured to read all of the cookie information from said storage path.

Preferably, the full information reading unit further comprises an encryption method identifying sub-unit and a decryption sub-unit. The encryption method identifying sub-unit is configured to analyze and identify the encryption method of the cookie information read from the parent browser. The decryption sub-unit is configured to decrypt said cookie information according to the encryption method.

Additionally, the specific information reading unit comprises a parent browser startup sub-unit, a domain name acquiring sub-unit, and a specific cookie information acquiring sub-unit. The parent browser startup sub-unit is configured to start up a parent browser. The domain name acquiring sub-unit is configured to acquire the domain name of a target website corresponding to the specific cookie information. The specific cookie information acquiring sub-unit is configured to search the cookie information corresponding to the domain name of the target website according to a mapping table of the domain name and the cookie, which table is created in memory after starting up of the parent browser.

Preferably, the importing module 20 comprises a child browser storage path identifying unit, an encrypting unit and an importing unit. The child browser storage path identifying unit is configured to identify the storage path of the cookie information of the child browser. The encrypting unit is configured to encrypt the cookie information read from the parent browser according to the encryption method of the child browser. The importing unit is configured to import the encrypted cookie information into the child browser according to the storage path of the cookie information of the child browser.

It should be understood that the importing module 20 further comprises a full information importing unit and/or a specific information importing unit. The full information importing unit is configured to import all of the cookie information in the parent browser into the child browser. The specific information importing unit is configured to import specific cookie information in the parent browser into the child browser.

Preferably, the specific information importing unit comprises an information transferring sub-unit and an information writing sub-unit. The information transferring sub-unit is configured to transfer the cookie information read from the parent browser into the process of the child browser. Preferably, the information transferring sub-unit adapts memory mapping or file writing to realize the transferring of the cookie information read from the parent browser into the child browser, particularly comprising establishing a mapping area in memory or creating a file, and writing the cookie information read from the parent browser into the mapping area or the file, so as for the child browser to read the cookie information from the mapping area or the file into the child browser process. The information writing sub-unit is configured to invoke system functions to write the cookie information in the process of the child browser into the child browser according to the storage path of the cookie information of the child browser, after starting up the child browser and before accessing to the webpage corresponding to the specific cookie information.

Figure 4:
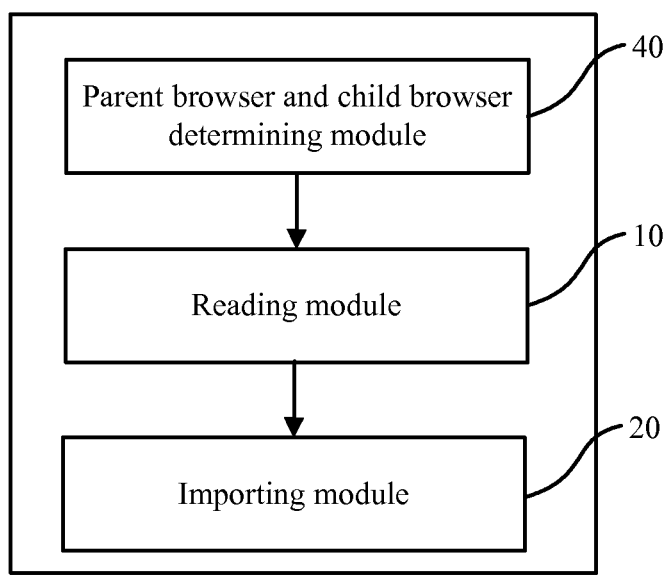
FIG. 4 is a structural schematic diagram of a second embodiment of the cookie information sharing system according to this application.

Referring to FIG. 4, it is shown a second embodiment of the cookie information sharing system of this application, which further comprises a parent browser and child browser determining module 40, configured to determine the parent browser which stores the cookie information and the child browser which needs the cookie information according to the user's designation.

The cookie information sharing system of this application can be installed in operating system as standalone software, and can also be used as a plugin or function module of an application software, for example, as a function module of a browser.

The cookie information sharing system of this invention can realize sharing and synchronization of cookie information between different browsers by acquiring the cookie information already stored in a parent browser and importing it into a child browser, so as to achieve effective usage of resources. When user using a new browser, it is not necessary to re-input information which has been already input in other browsers, therefore facilitating its usage.

Embodiments of the individual components of the invention may be implemented in hardware, or in a software module running on one or more processors, or in a combination thereof. It will be appreciated by those skilled in the art that, in practice, some or all of the functions of some or all of the components in the cookie information sharing system according to individual embodiments of the invention may be realized using a microprocessor or a digital signal processor (DSP). The invention may also be implemented as an apparatus or a device program (e.g., a computer program and a computer program product) for carrying out a part or all of the method as described herein. Such a program implementing the invention may be stored on a computer readable medium, or may be in the form of one or more signals. Such a signal may be obtained by downloading it from an Internet website, or provided on a carrier signal, or provided in any other form.

Figure 5:
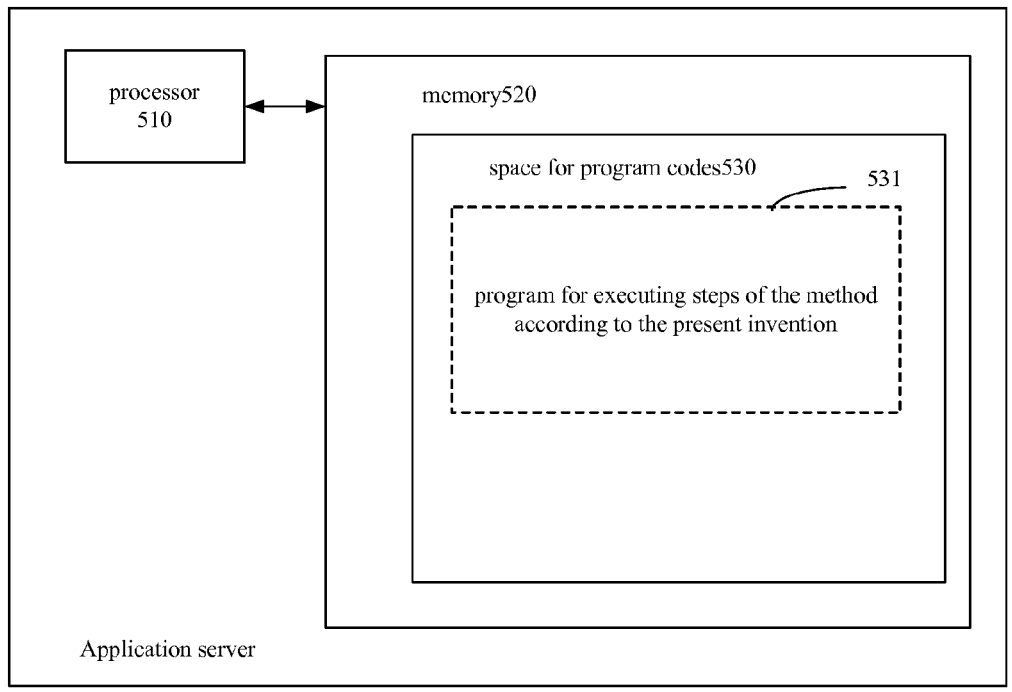
FIG. 5 schematically shows a block view of a server for performing the method according to this invention.
Figure 6:
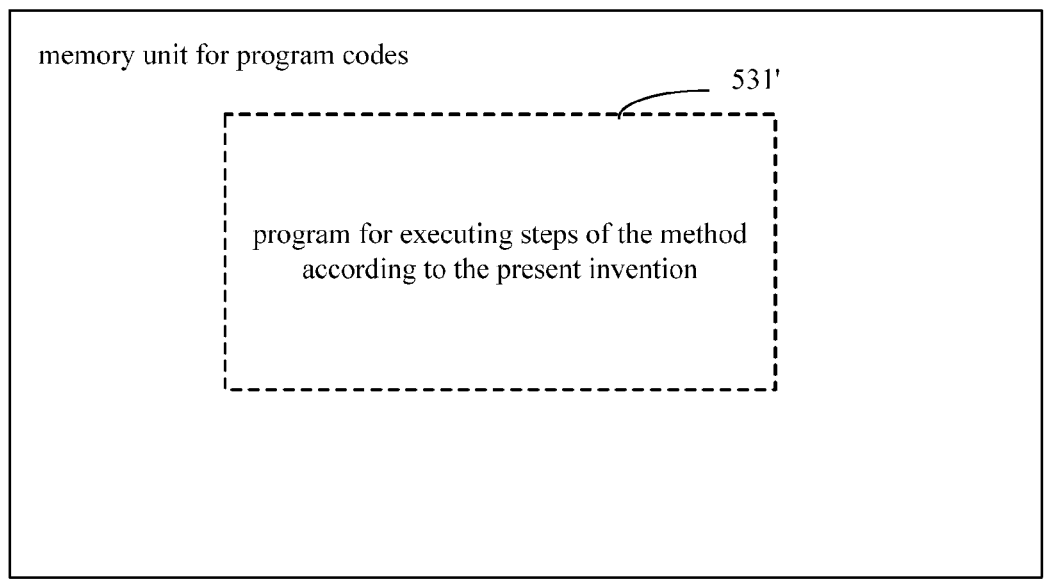
FIG. 6 schematically shows a storage unit for retaining or carrying program codes implementing the method according to this invention.

For example, FIG. 5 shows a server, e.g, an application server which can realize the cookie information sharing method according to this invention. There are traditionally included a processor 510 and computer program products or computer readable media in the form of a storage 520 on the server. The storage 520 may be an electronic storage such as flash, EEPROM (Electrically Erasable Programmable Read Only Memory), EPROM, hard drive, or ROM. The storage 520 has a storage space 530 for executing the program codes 531 of any steps in the method described above. For example, the storage space 530 for the program codes may comprise each program code 531 for realizing respective each step in the method described above. These program codes may be read from or written into one or more computer program products. These computer program products comprise some program code carriers such as hard drive, compact disc (CD), storage card or floppy diskette. Such a computer program product is generally a portable or fixed storage unit described with reference to FIG. 6. The storage unit may have storage segments, storage spaces arranged in a similar way as the storage 520 in the server of FIG. 5. The program codes can be, for example, compacted in appropriate form. Generally, the storage unit comprises computer readable codes 531', i.e., codes read by a processor such as 510, which codes, upon being run by a server, cause the server to execute each step in the method described above. "One embodiment", "a embodiment" or "one or more embodiments" referred in this description means that specific features, structures or properties described in connection with embodiments are included in at least one embodiment of this invention. Additionally, it should be noted that a term "in one embodiment" is not necessary to indicate the same one embodiment.

In this specification provided herein, a large amount of details are described. However, it should be understood that the embodiments of this invention can be practiced without these particular details. In some embodiments, known methods, structures and technologies are not illustrated in detail, in order not to obstruct understanding of this invention.

It should be noted that those embodiments illustrate this invention, rather than limit this invention, and those skilled in the art can design alternative embodiments without departing from the scope of appended claims. In claims, any reference signs between parentheses should not be considered as limit to claims. Word "Comprising" doesn't exclude elements or steps not listed in claims. Word "a", "an", or "one" proceeding an element doesn't exclude existence of one or more of such elements. This invention can be realized with the aid of computer which comprises hardware having several different elements, and appropriate program. In individual claims listing several devices, some of these devices may be implemented by the same one hardware. Use of words "first", "second" and "third" doesn't represent any sequence. These words can be understood as names.

Furthermore, it should be noted that, language used in this specification is selected mainly for the purpose of readability and teaching, rather than explanation or limiting the subject of this invention. Therefore, many modifications and alterations are apparent to those ordinary skilled in the art without depart from the scope and spirit of the appended claims. As to the scope of this invention, the disclosure of this invention is illustrative, rather than limiting, the scope of this invention being defined by the appended claims.

The invention claimed is:

1. A method for sharing cookie information between different browsers on a same computing device, comprising:
   starting up, by at least one processor, a parent browser;
   obtaining by the parent browser, by the at least one processor, resources associated with a domain name of a website at a first time including cookie information from a website server;
   creating by the parent browser, by the at least one processor, a mapping table in memory of the computing device and storing the cookie information by the parent browser in the mapping table that includes an association between the domain name and the cookie information;
   requesting, by the at least one processor, specific cookie information corresponding to the domain name of a target website to be imported from the parent browser into a child browser directly;
   searching, by the least one processor, for the specific cookie information corresponding to the domain name of the target website in the mapping table, and then reading the specific cookie information; and
   importing, by the least one processor, the specific cookie information read from the parent browser into the child browser.

2. The method according to claim 1, wherein reading the specific cookie information in the parent browser comprises: reading according to a user's designation or reading automatically.

3. The method according to claim 1, wherein the importing the specific cookie information in the parent browser into the child browser comprises:
   transferring the cookie information read from the parent browser into a process of the child browser; and
   invoking system functions to write the cookie information in the process of the child browser into the child browser according to a storage path of the child browser, after starting up the child browser and before accessing the webpage corresponding to the specific cookie information.

4. The method according to claim 3, wherein the transferring the cookie information read from the parent browser into the process of the child browser includes file reading and writing, comprising: creating a file; and
   writing the cookie information read from the parent browser into the file for the child browser to read the cookie information from the file and transfer into the child browser process.

5. The method according to claim 1, wherein the method further comprises:
    determining the parent browser storing the cookie information and the child browser acquiring the cookie information according to a user's designation.

6. A system for sharing cookie information between different browsers on a same computing device, comprising:
    a memory having instructions stored thereon; and
    a processor to execute the instructions to perform operations for sharing cookie information, the operations comprising:
    starting up a parent browser;
    obtaining by the parent browser, resources associated with a domain name of a website at a first time including cookie information from a website server;
    creating by the parent browser, a mapping table in memory of the computing device and storing the cookie information by the parent browser in the mapping table that includes an association between the domain name and the cookie information;
    requesting, specific cookie information corresponding to the domain name of a target website to be imported from the parent browser into a child browser directly;
    searching for the specific cookie information corresponding to the domain name of the target website in the mapping table, and then reading the specific cookie information; and
    importing the specific cookie information read from the parent browser into the child browser.

7. The system according to claim 6, wherein the operation of reading the specific cookie information in the parent browser comprises:
    receiving a user's designation, reading the specific cookie information in the parent browser according to the user's designation; or
    reading the specific cookie information in the parent browser automatically.

8. A non-transitory computer readable medium having instructions stored thereon that, when executed by a server cause the server to perform operations for sharing cookie information between different browsers on a same computing device, the operations comprising:
    starting up a parent browser;
    obtaining by the parent browser, resources associated with a domain name of a website at a first time including cookie information from a website server;
    creating by the parent browser, a mapping table in memory of the computing device and storing the cookie information by the parent browser in the mapping table that includes an association between the domain name and the cookie information;
    requesting, specific cookie information corresponding to the domain name of a target website to be imported from the parent browser into a child browser directly;
    searching for the specific cookie information corresponding to the domain name of the target website in the mapping table, and then reading the specific cookie information; and
    importing the specific cookie information read from the parent browser into the child browser.

* * * * *